United States Patent
Touret et al.

(10) Patent No.: US 10,037,638 B2
(45) Date of Patent: Jul. 31, 2018

(54) SIMPLIFIED AUTHENTICATION METHOD FOR CONTROLS ON PERSONS

(71) Applicant: Safran Identity & Security, Issy-les-Moulineaux (FR)

(72) Inventors: Olivier Touret, Issy les Moulineaux (FR); Pierre Chastel, Issy les Moulineaux (FR)

(73) Assignee: SAFRAN IDENTITY & SECURITY, Issy les Moulineaux (FR)

( * ) Notice: Subject to any disclaimer, the term of this patent is extended or adjusted under 35 U.S.C. 154(b) by 0 days.

(21) Appl. No.: 15/602,737

(22) Filed: May 23, 2017

(65) Prior Publication Data

US 2017/0345235 A1    Nov. 30, 2017

(30) Foreign Application Priority Data

May 24, 2016 (FR) ...................................... 16 54634

(51) Int. Cl.
    *G07C 9/00* (2006.01)
    *G06F 21/32* (2013.01)
    *H04L 9/32* (2006.01)

(52) U.S. Cl.
    CPC ......... *G07C 9/00087* (2013.01); *G06F 21/32* (2013.01); *H04L 9/3231* (2013.01)

(58) Field of Classification Search
    CPC .......... G06F 21/32; G06F 21/34; G06F 21/83; G06F 21/35; G06F 21/31; G06F 21/6245; G06F 2203/04106; G06F 2221/2107
    USPC ...................................................... 340/5.53
    See application file for complete search history.

(56) References Cited

U.S. PATENT DOCUMENTS 9,699,331 B2 *   7/2017   Talwerdi ............ G07C 9/00087

FOREIGN PATENT DOCUMENTS

| EP | 2259232 | 12/2010 |
|---|---|---|
| FR | 2975550 | 5/2011 |
| WO | WO2013153118 | 10/2013 |

OTHER PUBLICATIONS

European Search Report with English Cover Sheet, dated May 30, 2017, European Application No. 17169113.

* cited by examiner

*Primary Examiner* — Mark Blouin
(74) *Attorney, Agent, or Firm* — Womble Bond Dickinson (US) LLP

(57) ABSTRACT

The invention proposes a method for controls on persons in possession of a document comprising a machine-readable zone containing a document number and an electronic chip in which an authentication biometric is stored, comprising:
at a first step (100),
    acquiring (120) a biometric datum,
    acquiring (110) the document number by reading the machine-readable zone, and
    recording (130), in a memory (20), the number linked with the biometric datum, and
at a second step (200),
    acquiring (210) a biometric,
    from said biometric datum retrieving (220), in the memory, the number of the identity document corresponding to the person,
    accessing the content of the chip and retrieving the authentication biometric datum (240), and
    performing authentication (250) of the person by comparing the authentication biometric datum with a biometric datum of the person.

15 Claims, 3 Drawing Sheets

SIMPLIFIED AUTHENTICATION METHOD FOR CONTROLS ON PERSONS

FIELD OF THE INVENTION

The invention concerns a method for controls on persons in possession of an identity document such as a passport comprising a machine-readable zone, containing a document number and an electronic chip in which an authentication biometric datum of the person is stored. The invention also applies to controls on persons for access to a protected area or service such as access to boarding on an aircraft.

STATE OF THE ART

Identity control is sometimes required when a person accesses a protected area or service e.g. when crossing a border or when boarding on an aircraft.

Electronic identity documents such as electronic passports or identity cards allow identity control to be carried out by biometric authentication i.e. by comparing a biometric datum acquired on a biometric feature of a person with a biometric datum pre-recorded in a chip contained in the identity document.

Such documents allow increased security since the biometric contained in the document can be protected and signed by an official entity which issued the document, and can be verified at the time of control.

They also allow automation of identity controls by means of dedicated control devices whereby passport holders can themselves submit their passports for read-out to a control device.

However, the physical handling of identity documents, and in particular in booklet form such as passports, can raise difficulties for a person wishing to identify him or herself.

The biometric data contained in identity documents have read protection. To have access thereto, the number of the identity document must be obtained that is located in a machine-readable zone (MRZ). Said machine-readable zone is part of the surface of the document (or optionally one of the pages thereof) comprising printed text in normalised format so that it can be read by a computer and decrypted by optical recognition of the printed characters.

Therefore, to perform authentication, the person must present the document on the particular page of the document in which the machine-readable zone is contained, in a specific direction allowing read-out by a reader of the control device. Once the number is obtained, it can be used to gain access to the content of the chip.

As a result, if the identity document is not properly presented, authentication of the person can fail.

This physical handling step is time-consuming and tends to cause congestion in waiting queues e.g. at airports. In addition, it is the cause of a substantial proportion of failed authentications of persons.

It is consequently necessary, for the decongestion of queues at border points, to limit handling of these documents as much as possible in order to carry out authentication of persons for control purposes.

One solution to this problem has already been proposed. It proposes splitting the control step into two, with a first step at which handling of the identity document is required, and a second step at which authentication takes place without handling of the identity document.

More specifically, at a first step the passport is handled by the person to position it correctly on a reader of a control device which reads the machine-readable zone of the passport and accesses the biometric datum contained in the passport, in this case an image of the face of the person.

A number is associated with this biometric datum and a ticket carrying this number is issued to the person. The biometric datum and the number are recorded in a database.

At the second step, the person presents the ticket to a second control device. This device reads the number on the ticket and accesses the database to retrieve the corresponding biometric datum.

At the same time, a photograph of the person is taken by the control device and this photograph is compared with the biometric datum retrieved from the base (and which corresponds to the biometric datum stored in the passport) to carry out biometric authentication of the person.

With this solution, it is therefore possible to move the time-consuming step of passport handling upstream of the authentication step which gives access to the secure area, and to decongest the queue at this step.

However, this solution does not fully solve the problem, since the ticket issued to a person represents an additional document to be kept which may be lost or exchanged. In addition, it is nevertheless necessary to handle this ticket at the second step, which may take more time and cause errors.

PRESENTATION OF THE INVENTION

It is an objective of the invention to overcome the issues raised above. In particular, it is one of the objectives of the invention to propose an automatic control method minimising handling of documents by holders thereof.

A further objective of the invention is to reduce the time needed to carry out the authentication step.

A further objective of the invention is to propose a control method that is simple and practical for persons to implement.

In this respect, the object of the invention is a method for controls on persons in possession of an identity document comprising a machine-readable zone containing a document number and an electronic chip in which an authentication biometric datum of the person is stored, the method comprising:

at a first step implemented by a first control device,
        acquiring a first biometric datum on a biometric feature of the person,
        acquiring the number of the person's identity document by reading the machine-readable zone of the identity document, and
        recording in a remote memory the number linked with the person's biometric datum, and
    at a second step implemented by a second control device,
        acquiring a second biometric datum on the same biometric feature of the person as the one on which the first biometric datum was acquired,
        from the second biometric datum retrieving in the memory the number of the identity document corresponding to the person's biometric feature,
        from the number of the person's identity document, accessing the content of the electronic chip of the identity document and retrieving the authentication biometric datum, and
        performing biometric authentication of the person by comparing the authentication biometric datum stored in the chip with a biometric datum acquired by the second control device.

Advantageously, but optionally, the method of the invention may further comprise at least one of the following characteristics:

the biometric datum acquired by the second control device for the biometric authentication step may be the second biometric datum or another biometric datum acquired on a different biometric feature.

the retrieval step of the number of the identity document in the memory may comprise:
  comparison of biometric data stored in the memory with the second biometric datum, and
  selection of at least one number corresponding to at least one biometric datum having a similarity rate with the second biometric datum higher than a predetermined threshold.

if more than one identity document number has been selected, the step to access the content of the chip of the identity document may comprise the implementation of an attempt to open the chip with each selected number until opening of the chip.

the first step may also comprise the recording in the remote memory of at least one additional datum linked with the number of the identity document and the first biometric datum, and the step to retrieve the number of the identity document comprises the preselection, in the memory, of the biometric datum and document numbers associated with said additional datum.

at the second step, the additional datum may be acquired by the second control device, or it may be known to the second control device by being associated therewith i.e. being intrinsically related thereto.

the biometric feature on which the first and second biometric data are acquired can be selected from the group comprising: one or more fingerprints, one or more iris scans, the person's face, the venous network of one of more fingers or of one or both hands, or the respective sizes of phalanges or fingers.

the step may comprise the acquisition of a plurality of biometric data on different biometric features of the person, and the recording of the document number linked with each of the biometric features.

the identity document may be a passport, and:
  at the first step, the passport is presented open on the page of the machine-readable zone to the first control device to implement the acquisition step of the passport number, and
  at the second step, the passport is presented closed to the second control device to implement the step to access the content of the chip.

at the second step, the passport can be presented in any orientation relative to the second control device.

the first control device may be physically remote from the second, and is a personal device owned by the person from among a mobile telephone, tablet computer, personal computer or a kiosk installed within one same infrastructure as the second control device.

Another object of the invention concerns a computer readable medium comprising code instructions to implement the method comprising steps of:
  acquiring and processing an image of a person's biometric feature to obtain a biometric datum,
  reading a machine-readable zone of an identity document to acquire a document number, and
  recording, in a remote memory, the number linked with the biometric datum,
when executed by a processor.

A further object of the invention also concerns a computer readable medium comprising code instructions to implement the method comprising steps of:
  acquiring and processing an image of a person's biometric feature to obtain a biometric datum,
  from said biometric datum, retrieving in a memory an identity document number corresponding to the biometric feature from which the biometric datum was acquired, and
  from the number of the person's identity document accessing the content of the electronic chip of the identity document and retrieving an authentication biometric contained in said chip,
when executed by a processor.

A further object of the invention is a system for controls on persons, comprising:
  a memory,
  a first control device comprising a module to read a machine-readable zone of an identity document, a module to acquire a biometric datum, and a communication interface with the memory, and
  a second control device comprising a module to acquire a biometric datum, a reader adapted to access the content of a chip of an identity document, and a communication interface with the memory,
characterized in that it is adapted to implement the method described in the foregoing.

Advantageously, but optionally, in the system of the invention for controls on persons, the first control device is a personal electronic device owned by the person from among a personal computer, mobile telephone and tablet computer.

The proposed invention allows facilitation of the control method since the handling step of the identity document is separate from the authentication step and can even be carried out by the person using a personal electronic device such as a mobile telephone at a place chosen by the person (e.g. at home).

In addition, the authentication step is facilitated since all that is required is to obtain a new biometric datum of the person in order to be able to retrieve the number of the identity document and access the content of the chip. It is therefore not necessary to handle the document for presentation of the machine-readable zone to a reader. In the case of a document in booklet form such as a passport, said document can even be presented closed to the control device since this does not prevent the control device from accessing the content of the chip.

Furthermore, no additional document needs to be added to the identity document to carry out authentication.

DESCRIPTION OF THE FIGURES

Other characteristics, objectives and advantages of the present invention will become apparent on reading the following detailed description, in connection with the appended drawings given as non-limiting examples and in which.

DETAILED DESCRIPTION OF AT LEAST ONE EMBODIMENT OF THE INVENTION

System for Controls on Persons

Figure 1:
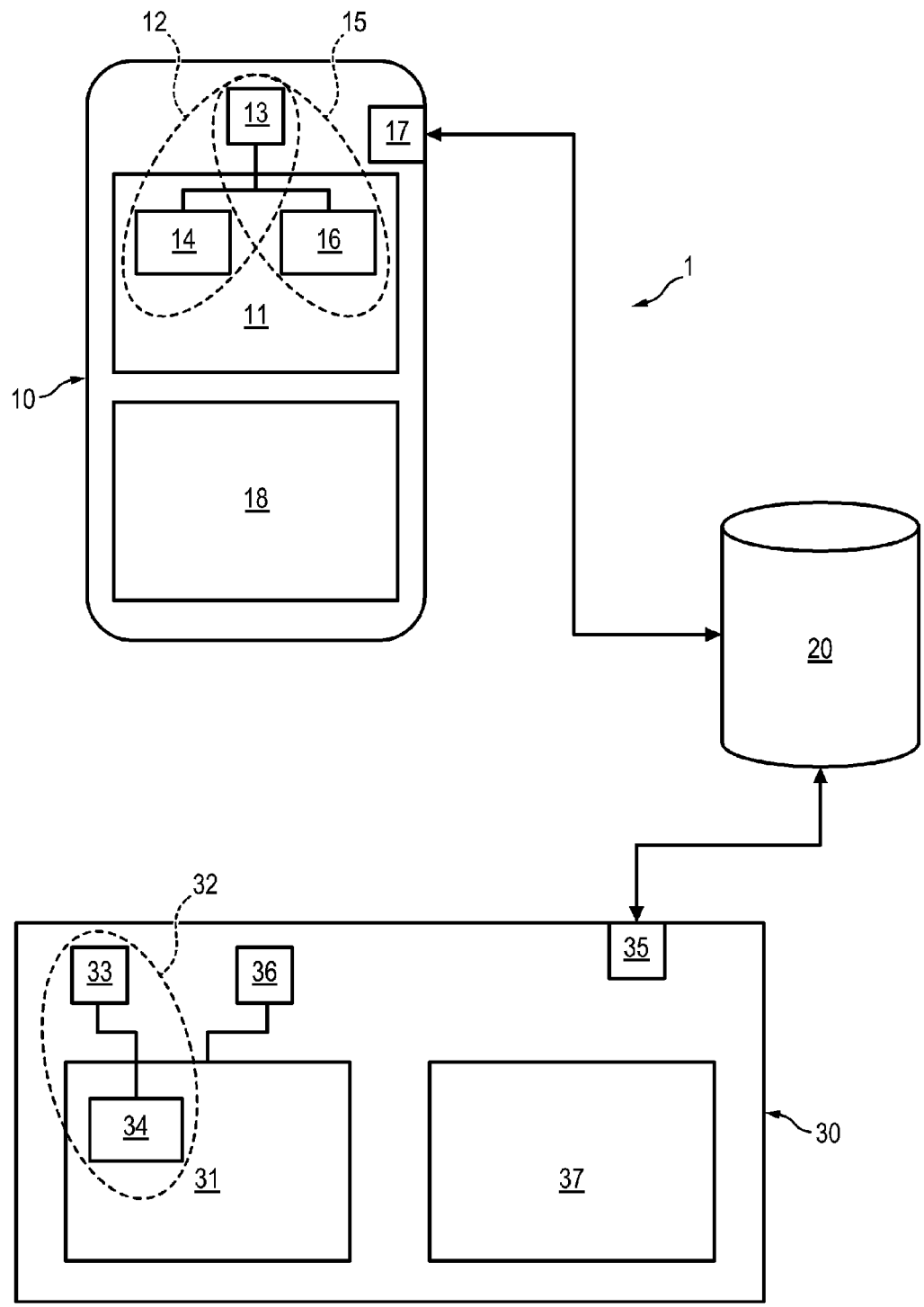
FIG. 1 schematically illustrates a control system,
FIGS. 2 and 3 schematically illustrate the main steps of a control method.

With reference to FIG. 1, a system for controls on persons 1 is illustrated. This system allows the biometric authentication of persons, to authorise or deny access of persons to a secure area or service.

For control to be carried out, the person must be in possession of an identity document comprising an electronic chip e.g. RFID chip in which a biometric, acquired from a biometric feature of the individual, is stored.

The biometric contained in the identity document is termed an authentication biometric in the remainder hereof.

The identity document also contains a number identifying said document, this number being printed in a machine-readable zone (MRZ) i.e. a portion of the surface of the document or of one of its pages in a format readable by a computer or any equivalent processing unit able to perform optical recognition of characters.

The identity document is advantageously a passport i.e. a document in booklet form comprising covers and a set of pages, the machine-readable zone being contained in one of the pages of the booklet, which implies opening of the passport at the right page and correct positioning of the passport for the reading of this zone.

The system for controls on persons can be used for example to check persons before embarking on board an aircraft or before crossing national borders.

The system 1 for controls on persons comprises a first control device 10, a memory 20 and a second control device 30.

The second control device 30 is advantageously arranged at the entry to a secure access area. It may be in the form of a gate through which a person may only be authorised to pass in the event of successful authentication.

The first control device 10 is advantageously an electronic device personal to the individual i.e. a personal computer, mobile telephone or tablet computer.

As a variant, it may be a fixed control structure such as a kiosk located within the same infrastructure (e.g. the same building) as the control device 30 and at a distance therefrom. For example, regarding control at an airport before embarking on an aircraft, the first control device can be located in the same departure terminal as the second device. However, it is not located in the queue of the second control device so that it is possible divide the flow of persons using the two devices.

The first control device 10 comprises a computer 11 e.g. a processor, microprocessor, controller, etc.

It also comprises a module 12 to read the content of a machine-readable zone, MRZ, of a document. For example, the module 12 may comprise an image sensor 13 such as a digital still camera or digital video camera adapted to acquire an image of the machine-readable zone, and a character recognition module 14. The module 14 may be a software application that can be executed by the computer 11 or alternatively a physical module. This may be the case for example when the first control device is the individual's mobile telephone or tablet or personal computer and when this device is configured to perform character recognition. As variant, the processing of the image of the machine-readable zone can be performed remotely if the individual's device does not have this functionality. In this case, the module 14 may be a software application that can be executed by a computer of another processing unit remote from the first control device (not illustrated), the first control device then comprising a communication interface with the remote processing unit to send the image of the machine-readable zone on which character recognition is to be performed.

In addition, the control device 10 comprises a module 15 to acquire a biometric on a biometric feature of a person. For example, the biometric may be the shape of the face, one or more finger prints of the persons, or one or more iris scans of the person. It may also be the venous network structure of one of more fingers or of one or both hands, or the respective sizes of phalanges or fingers.

The biometric acquisition module 15 comprises an image sensor that is advantageously the sensor 13 indicated above, and an image processing module 16 adapted to extract a biometric from an image of a biometric feature. The extraction of the biometric is performed by processing the image of the biometric feature and is dependent on the type of biometric feature. Various types of image processing to extract biometric data are known to those skilled in the art. As a non-limiting example, the extraction of the biometric may comprise extraction of the minutia of fingerprints from a fingerprint image. As a variant, it may comprise extraction of particular points of the shape of a face if the image is an image of the person's face, etc.

Finally, the first control device 10 comprises a remote communication interface 17 with a memory 20 of the control system 1. This interface allows the computer 11 to exchange information with the memory 20. The memory 20 is advantageously remote from the first control device 10. Therefore, the communication interface 17 is preferably the combination of a wireless communication interface e.g. of Wi-Fi or Bluetooth type or a mobile telephone network (GPRS, 3G, 4G or other) with any other downstream communication network connecting with the memory 20.

Advantageously, but optionally, the first control device 10 may finally comprise a data entry interface 18 such as a keypad, touch screen, etc.

The second control device 30 comprises a computer 31 which may also be a processor, microprocessor, controller, etc.

It also comprises a module 32 to acquire a biometric from a biometric feature of an individual, which advantageously comprises an image sensor 33 adapted to acquire an image of a person's biometric feature, and an image processing module 34 adapted to extract a biometric from an image of a biometric feature via suitable processing of the image of the biometric feature. The image sensor 33 may be a digital still camera for example or digital video camera. As is the case with the image processing module 16, the extraction technique used by the module 34 is known to those skilled in the art and is dependent on the type of biometric feature under consideration.

The memory 20 of the control system 1, already mentioned above, may be a memory integrated in the control device 30. As variant, it may be a memory remote from the control device 30, advantageously a database. In this case, the device may also comprise a remote communication interface 35 with the memory 20.

Finally, the second control device 30 comprises a reader 36 of an identity document chip. Typically, the chip contained in the identity document is a radio frequency chip (e.g. a radio-identification RFID label or UHF chip), and the reader 36 is adapted for remote reading of the chip via radiofrequency communication with the chip.

The second control device 30 may also comprise a data entry interface 37 such as a keypad, touch screen, etc.

The system 1 is adapted to implement the control method described below.

Method for Controls on Persons

Figure 2:
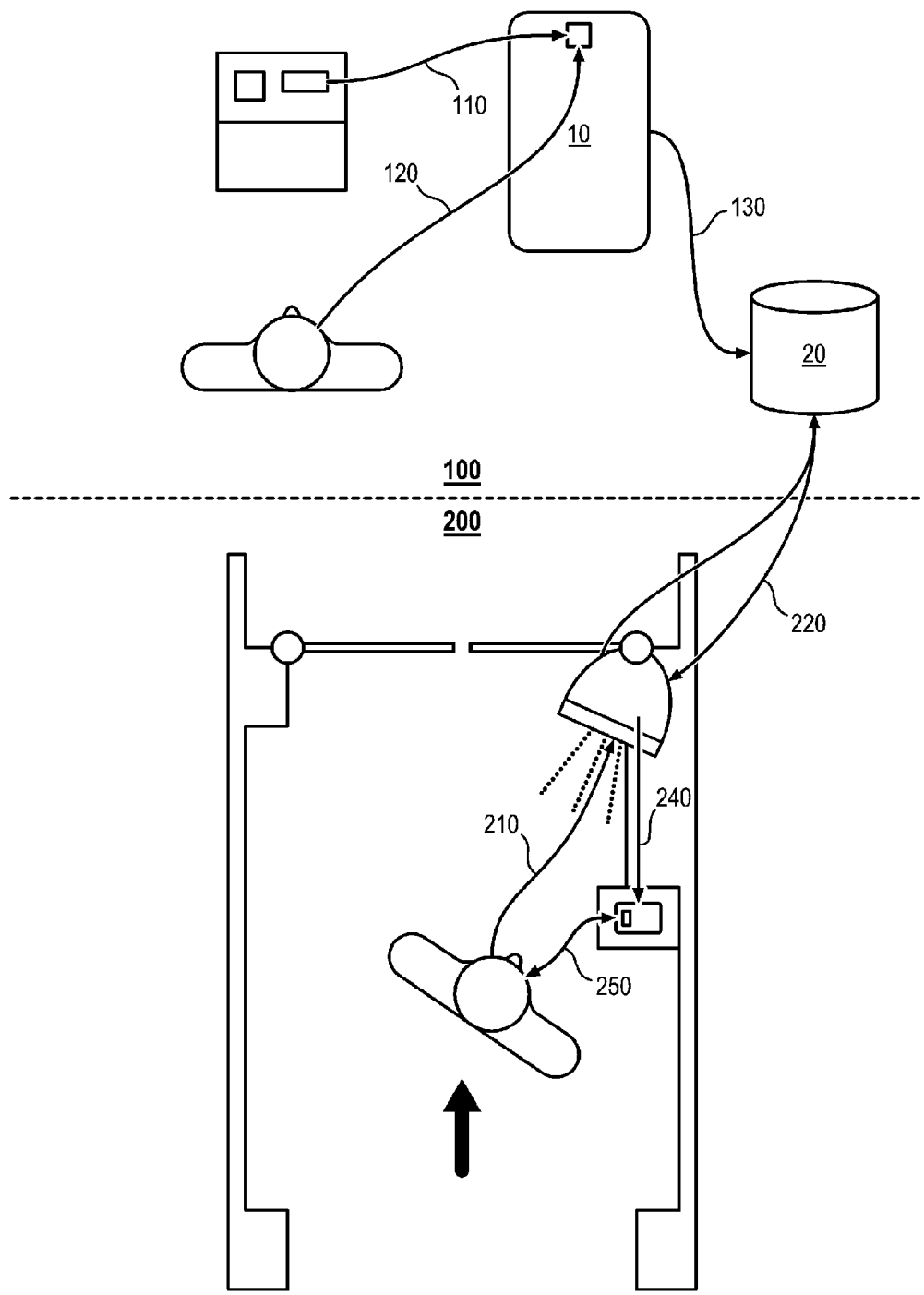
Figure 3:
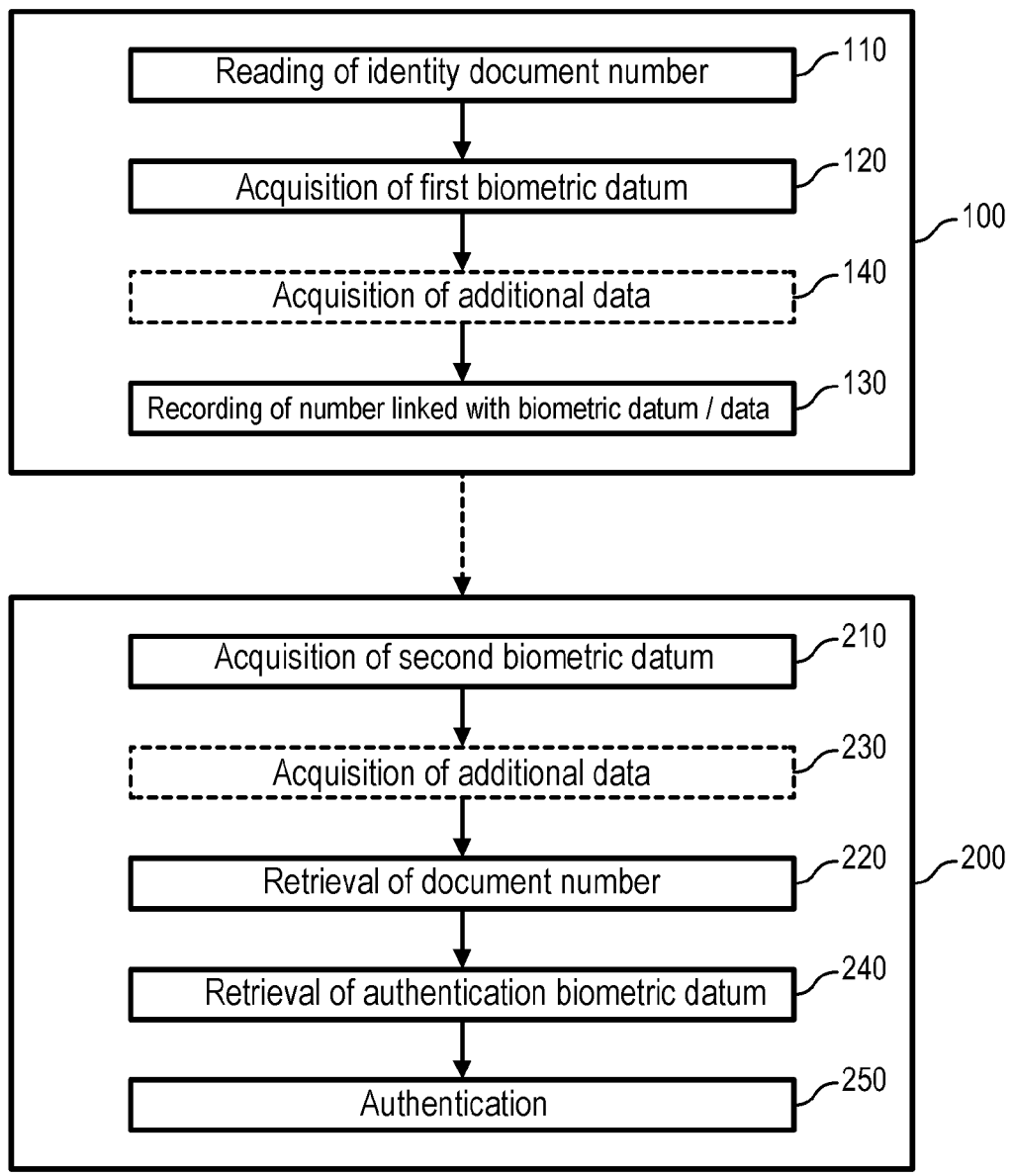

With reference to FIGS. 2 and 3 the main steps are illustrated of a method for controls on persons. With this method, it is possible to verify that a person presenting for control indeed corresponds to the person to whom the identity document was issued, via biometric authentication by taking a live biometric of the person and comparing this biometric with the authentication biometric stored in the chip contained in the document.

The method has a first step 100 implemented by the first control device 10. As has been seen, since the first control device is possibly a personal device owned by the individual, the first step 100 in this case can be implemented in any place that is convenient for the person and in particular at home.

The first step 100 comprises a step 110 to read the number of the identity document contained in the machine-readable zone of the document. This step requires the person to handle the identity document so as to present the document to the sensor 13 on the page of the machine-readable zone and with the machine-readable zone in line with the acquisition zone of the sensor 13 i.e. presented in a position and direction enabling the sensor to acquire an image of the zone. The read module 12 of the first control device acquires an image of the machine-readable zone and extracts the document number from this zone.

The first step 100 also comprises a step 120 to acquire a first biometric on a biometric feature of the person by means of module 12.

As variant, at step 120, several biometrics of the person can be acquired on different biometric features. For example, a first biometric from the person's iris and a second from the face or fingerprint, etc.

The order of succession of steps 110 and 120 is indifferent.

Next, at step 130, the first control device 10 records in the memory 20 the number of the identity document linked with the first biometric and when applicable with each of the biometrics acquired at step 120. As non-limiting example, data can be generated by the computer 11 comprising the number and first biometric e.g. in doublet form and stored in the memory.

The recording of several biometrics linked with the number of the identity document can make the method compatible with different technologies applied at different control points, or can increase the security of the method by using several biometrics in the remainder of the method to retrieve the number of the identity document.

Advantageously, but optionally, the first step 100 of the method may also comprise the acquisition 140 of additional data comprising:

Identity data on the person, these data possibly being compared with data given in the identity document and allowing increased control security (e.g. name, forename(s), date and place of birth), and/or Data allowing distinguishing of the person among a group of persons passing through the same control. For example, for embarkation on board a flight, the data may comprise the flight number, name of the airline, the take-off and/or landing airport, etc. As a variant, for border crossings, this may be a visa number, country of origin, etc.

The acquisition step 140 is advantageously implemented before step 130, and in this case at this step 130 the data allowing distinguishing of the person are also recorded in connection with the document number and acquired biometric of the person.

The method next comprises a second step 200 performed by the second control device 30. This step is implemented after step 100, for example a few minutes or few hours later, even the next day or several days after.

At this second step 200, the person comes before the second control device 30 and presents to the biometric acquisition module 32 the same biometric feature as the feature from which the first biometric was acquired. A second biometric is acquired on this feature at step 210.

At step 220, the second control device 30, using this biometric, retrieves in the memory 20 the document number previously recorded for the same person. To do so, the device searches memory 20 for a biometric corresponding to the second biometric i.e. the one acquired on the same feature, by comparing the second biometric with the biometrics recorded in the memory. A match is found if a similarity rate between two biometrics exceeds a predetermined threshold, which is dependent on the manner in which comparison is made and the type of biometric feature. One non-limiting example of performing a comparison between two data is via distance calculation (Euclidian distance, Hamming distance, etc.) between the data.

The control device 30 then retrieves the document number corresponding to each of the biometrics having a match with the second biometric that is higher than said threshold. The control device 30 may therefore retrieve one or more document numbers.

If several biometrics have been acquired on different biometric features at step 120, then either several biometrics are acquired on the same features at step 210 and are used at step 220 to search for the number of the identity document, which increases the security of the document, or a single biometric is acquired and used at step 220. The diversity of biometrics acquired at step 120 will increase the compatibility of the method with different control devices 30.

If, at step 100, additional data for distinguishing of the person were recorded linked with the first biometric and with the document number, step 200 may comprise an additional step 230 to acquire additional data for which the person again enters the same data as at step 140. Advantageously, this data entry is not necessary if these additional data at step 140 are intrinsically and hence previously known to the control device 30 e.g. via location if such data designates the airport at which the control device 30 is located.

This step 230 is implemented before step 220. In this case, the additional data are used to restrict the number of biometrics in the memory to be compared with the second biometric, by only selecting biometrics recorded in the memory that are linked with the same additional data (e.g. same flight number, same destination, etc.).

This accelerates implementation of step 220 and reduces the number of document numbers obtained at the end of this step.

Step 200 then comprises step 240 at which the identity document is presented by the person to the reader 36 of the second control device, and the control device 30 reads the content of the document chip to retrieve the authentication biometric using the document number or numbers acquired.

Since the reader 36 only reads the information stored in the chip contained in the document, and not the information indicated in a machine-readable zone, it is not necessary to present the document opened or in a particular direction. In particular, the passport can be presented closed e.g. being placed on a dedicated support (not illustrated) of the second control device. This entails considerable time savings for the person who no longer needs to handle the identity document in any particular manner, or any other document with a readable zone or bar code that has to be read, and eliminates failure risks related to such handling.

The reader accesses the authentication biometric using the document number as password. In the event that, after step 220, several numbers have been retrieved, the reader attempts to open the chip using the numbers one after the other until the number is used which corresponds to the person's identity document and authorises access to the content of the chip.

Step 200 next comprises a biometric authentication step 250 of the person. This step comprises comparison of the authentication biometric contained in the document chip with another biometric acquired on the same feature. This other biometric may be the second biometric which was acquired to retrieve the document number in the memory, thereby simplifying step 250 which then does not comprise a biometric acquisition sub-step.

As variant, this other biometric may be a third biometric acquired by the control device solely for authentication purposes. This is notably the case if the biometric feature corresponding to the authentication biometric differs from the one corresponding to the first and second biometrics.

As a function of the result of biometric authentication, the person is authorised or denied access to the area.

Thus the proposed method therefore eliminates handling of the identity document at the second step at which biometric authentication of the person is performed, without adjoining the handling of any additional document, which simplifies and accelerates completion of this step.

The invention claimed is:

1. A method for controls on persons in possession of an identity document comprising a machine-readable zone containing a document number and an electronic chip in which an authentication biometric datum of the person is stored, the method comprising:
   at a first step implemented by a first control device,
      acquiring a first biometric datum on a biometric feature of the person,
      acquiring the number of the person's identity document by reading the machine-readable zone of the identity document, and
      recording, in a remote memory, the number linked with the person's biometric datum, and
   at a second step implemented by a second control device,
      acquiring a second biometric datum on the same biometric feature of the person as the one on which the first biometric was acquired,
      from the second biometric datum, retrieving, in the memory, the number of the identity document corresponding to the person's biometric feature,
      from the number of the person's identity document, accessing the content of the electronic chip of the identity document and retrieving the authentication biometric datum, and
      performing biometric authentication of the person by comparing the authentication biometric datum stored in the chip with a biometric datum acquired by the second control device.

2. The method according to claim 1, wherein the biometric datum acquired by the second control device for the biometric authentication step is the second biometric datum, or another biometric datum acquired on a different biometric feature.

3. The method according to claim 1, wherein the retrieval step of the number of the identity document in the memory comprises:
   comparison of biometric data stored in the memory with the second biometric datum, and
   selection of at least one number corresponding to at least one biometric datum having a similarity rate with the second biometric datum higher than a predetermined threshold.

4. The method according to claim 3, wherein if more than one identity document number has been selected, the step to access the content of the chip of the identity document comprises the implementation of an attempt to open the chip with each selected number until opening of the chip.

5. The method according to claim 3, wherein the first step also comprises the recording in the remote memory, of at least one additional datum linked with the number of the identity document and the first biometric datum,
   and the retrieval step of the number of the identity document comprises the preselection, in the memory, of biometric data and document numbers associated with said additional datum.

6. The method according to claim 5, wherein at the second step, the additional datum is acquired by the second control device, or is known to the second control device by being associated therewith.

7. The method according to claim 1, wherein the biometric feature on which the first and second biometric data are acquired is selected from the group comprising: one or more fingerprints, one or more iris scans, the person's face, the venous network of one or more fingers or of one or both hands, or the respective sizes of phalanges or fingers.

8. The method according to claim 1, wherein step comprises the acquisition of a plurality of biometric data on different biometric features of the person, and the recording of the document number linked with each of the biometrics.

9. The method according to claim 1, wherein the identity document is a passport, and:
   at the first step, the passport is presented open on the page of the machine-readable zone to the first control device to implement the acquisition step of the passport number, and
   at the second step, the passport is presented closed to the second control device to implement the step to access the content of the chip.

10. The method according to claim 9, wherein at the second step, the passport is presented in any orientation relative to the second control device.

11. The method according to claim 1, wherein the first control device is physically remote from the second, and is a personal device owned by the person from among a mobile telephone, tablet computer and personal computer or a kiosk installed within one same infrastructure as the second control device.

12. A computer readable medium comprising code instructions to implement the first step of the method according to claim 1, comprising steps of:
   acquiring and processing an image of a person's biometric feature to obtain a biometric datum,
   reading a machine-readable zone of an identity document to acquire a document number, and
   recording, in a remote memory, the number linked with the biometric datum, when executed by a processor.

13. A computer readable medium comprising code instructions to implement the second step of the method according to claim 1, comprising steps of:
   acquiring and processing an image of a person's biometric feature, to obtain a biometric datum,
   from said biometric datum, retrieving, in a memory, an identity document number corresponding to the biometric feature from which the biometric datum was acquired, and
   from the number of the person's identity document accessing the content of the electronic chip of the identity document and retrieving an authentication biometric datum contained in said chip,
   when executed by a processor.

14. A system for controls on persons, comprising:
   a memory,
   a first control device comprising a module to read a machine-readable zone of an identity document, a module to acquire a biometric datum, and a communication interface with the memory, and a second control device comprising a module to acquire a biometric datum, a reader adapted to access the content of a chip of an identity document, and a communication interface with the memory, wherein it is adapted to implement the method according to claim 1.

15. The system for controls on persons according to claim 14, wherein the first control device is a personal electronic device owned by the person, from among a personal computer, mobile telephone and tablet computer.

\* \* \* \* \*